United States Patent
Smith et al.

(10) Patent No.: US 10,979,309 B2
(45) Date of Patent: Apr. 13, 2021

(54) AUTOMATED CONVERGENCE OF PHYSICAL DESIGN AND CONFIGURATION OF SOFTWARE DEFINED NETWORK

(71) Applicant: Schweitzer Engineering Laboratories, Inc., Pullman, WA (US)

(72) Inventors: Rhett Smith, Odessa, FL (US); David M. Buehler, Moscow, ID (US); Josh Powers, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 152 days.

(21) Appl. No.: 16/534,637

(22) Filed: Aug. 7, 2019

(65) Prior Publication Data
US 2021/0044490 A1    Feb. 11, 2021

(51) Int. Cl.
| | |
|---|---|
| *H04L 12/24* | (2006.01) |
| *H04L 12/26* | (2006.01) |
| *G06F 9/451* | (2018.01) |
| *H04L 12/721* | (2013.01) |

(52) U.S. Cl.
CPC .............. *H04L 41/20* (2013.01); *G06F 9/451* (2018.02); *H04L 41/0886* (2013.01); *H04L 41/145* (2013.01); *H04L 45/38* (2013.01)

(58) Field of Classification Search
None
See application file for complete search history.

(56) References Cited

U.S. PATENT DOCUMENTS

| | | |
|---|---|---|
| 6,747,957 B1 | 6/2004 | Pithawala et al. |
| 7,218,632 B1 | 5/2007 | Bechtolsheim |
| 7,376,831 B2 | 5/2008 | Kollmyer |
| 7,872,983 B2 | 1/2011 | Lai |

(Continued)

FOREIGN PATENT DOCUMENTS

| | | |
|---|---|---|
| EP | 2765751 | 8/2014 |
| KR | 20150051107 | 5/2015 |
| WO | 2015038040 | 3/2015 |

OTHER PUBLICATIONS

Braun, Wolfgang, Menth, Michael, Software-Defined Networking Using OpenFlow: Protocols, Applications and Architectural Design Choices, Future Internet, May 12, 2014.

(Continued)

*Primary Examiner* — Scott M Sciacca
(74) *Attorney, Agent, or Firm* — Jared L. Cherry

(57) ABSTRACT

The present disclosure pertains to systems and methods for generation of a physical and logical design of a software defined network (SDN). In one embodiment, a system may receive a plurality of user-provided parameters associated with a plurality of performance requirements of the SDN. A library may include performance metrics of a plurality of devices comprised in the SDN. An SDN design subsystem may generate the physical and logical design of the SDN based on the user-provided parameters and the performance metrics of the devices in the library. A traffic routing subsystem may generate a plurality of communication flows based on the logical design of the physical and logical design and to be implemented by the SDN. An SDN simulation subsystem may generate an assessment of the physical and logical design of the SDN and the plurality of communication flows in comparison to the user-provided parameters.

20 Claims, 4 Drawing Sheets

(56) References Cited

U.S. PATENT DOCUMENTS

| | | | |
|---|---|---|---|
| 8,553,544 B2 | 10/2013 | Lai | |
| 8,800,044 B2 | 8/2014 | Raad | |
| 9,038,151 B1 | 5/2015 | Chua | |
| 9,237,129 B2 | 1/2016 | Ling | |
| 9,286,171 B2 | 3/2016 | Cardona | |
| 9,432,255 B1 | 8/2016 | Hasan | |
| 9,432,380 B2 | 8/2016 | Margalit | |
| 9,680,588 B2 | 6/2017 | Connolly | |
| 9,686,125 B2 | 6/2017 | Smith | |
| 9,769,060 B2 | 9/2017 | Dearien | |
| 9,866,483 B2 | 1/2018 | Smith | |
| 9,923,779 B2 | 3/2018 | Berner | |
| 10,263,705 B1 * | 4/2019 | Choudhury | H04L 41/145 |
| 2002/0172157 A1 | 11/2002 | Rhodes | |
| 2003/0112821 A1 | 6/2003 | Cleveland | |
| 2003/0125924 A1 | 7/2003 | Lines | |
| 2003/0133443 A1 | 7/2003 | Klinker | |
| 2003/0188159 A1 | 10/2003 | Josset | |
| 2005/0025141 A1 | 2/2005 | Chao | |
| 2005/0078672 A1 | 4/2005 | Caliskan | |
| 2005/0192008 A1 | 9/2005 | Desai | |
| 2008/0005558 A1 | 1/2008 | Hadley | |
| 2008/0080384 A1 | 4/2008 | Atkins | |
| 2009/0257743 A1 | 10/2009 | Chung | |
| 2009/0285093 A1 | 11/2009 | Bolt | |
| 2009/0313189 A1 | 12/2009 | Sun | |
| 2010/0241608 A1 | 9/2010 | Huang | |
| 2011/0085567 A1 | 4/2011 | Beecroft | |
| 2011/0087952 A1 | 4/2011 | Marin | |
| 2013/0077477 A1 | 3/2013 | Daraiseh | |
| 2013/0108259 A1 | 5/2013 | Srinivas | |
| 2013/0159865 A1 | 6/2013 | Smith | |
| 2013/0212285 A1 | 8/2013 | Hoffmann | |
| 2013/0250770 A1 | 9/2013 | Zou | |
| 2013/0263247 A1 | 10/2013 | Jungck | |
| 2013/0294228 A1 | 11/2013 | Ahuja | |
| 2014/0025945 A1 | 1/2014 | McGrew | |
| 2014/0029451 A1 | 1/2014 | Nguyen | |
| 2014/0064100 A1 | 3/2014 | Edwards | |
| 2014/0112130 A1 | 4/2014 | Yang | |
| 2014/0115706 A1 | 4/2014 | Silva | |
| 2014/0129700 A1 | 5/2014 | Mehta | |
| 2014/0153572 A1 | 6/2014 | Hampel | |
| 2014/0160939 A1 | 6/2014 | Arad | |
| 2014/0226467 A1 | 8/2014 | Park | |
| 2014/0241345 A1 | 8/2014 | DeCusatis | |
| 2014/0245387 A1 | 8/2014 | Colpo | |
| 2014/0280834 A1 | 9/2014 | Medved | |
| 2014/0325038 A1 | 10/2014 | Kis | |
| 2014/0325649 A1 | 10/2014 | Zhang | |
| 2014/0371941 A1 | 12/2014 | Keller | |
| 2014/0376406 A1 | 12/2014 | Kim | |
| 2015/0081762 A1 | 3/2015 | Mason | |
| 2015/0112933 A1 | 4/2015 | Satapathy | |
| 2015/0195190 A1 | 7/2015 | Shah Heydari | |
| 2015/0312658 A1 | 10/2015 | Winzer | |
| 2015/0363522 A1 | 12/2015 | Maurya | |
| 2016/0043996 A1 | 2/2016 | Syed Mohamed | |
| 2016/0119299 A1 | 4/2016 | Amulothu | |
| 2016/0142427 A1 | 5/2016 | de los Reys | |
| 2016/0165454 A1 | 6/2016 | Li | |
| 2016/0330076 A1 | 11/2016 | Tiwari | |
| 2016/0337247 A1 | 11/2016 | Yao | |
| 2016/0344592 A1 | 11/2016 | Cook | |
| 2016/0381124 A1 * | 12/2016 | Hwang | H04L 43/0817 709/226 |
| 2017/0026225 A1 | 1/2017 | Smith | |
| 2017/0026226 A1 | 1/2017 | Grussling | |
| 2017/0026243 A1 | 1/2017 | Bemer | |
| 2017/0026252 A1 | 1/2017 | Dearien | |
| 2017/0026276 A1 | 1/2017 | Dearien | |
| 2017/0026291 A1 | 1/2017 | Smith | |
| 2017/0026292 A1 | 1/2017 | Smith | |
| 2017/0026349 A1 | 1/2017 | Smith | |
| 2017/0195171 A1 * | 7/2017 | Wohlert | H04L 41/5009 |
| 2020/0119987 A1 * | 4/2020 | Griffin | H04L 41/0816 |
| 2021/0029029 A1 * | 1/2021 | Mehmedagic | H04L 63/0218 |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

* cited by examiner

AUTOMATED CONVERGENCE OF PHYSICAL DESIGN AND CONFIGURATION OF SOFTWARE DEFINED NETWORK

TECHNICAL FIELD

The present disclosure pertains to systems and methods for aiding in the configuration of a network. More specifically, but not exclusively, the present disclosure pertains to design of software defined networks (SDN) in which design parameters of a network converge to generate an optimized physical and logical network design.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
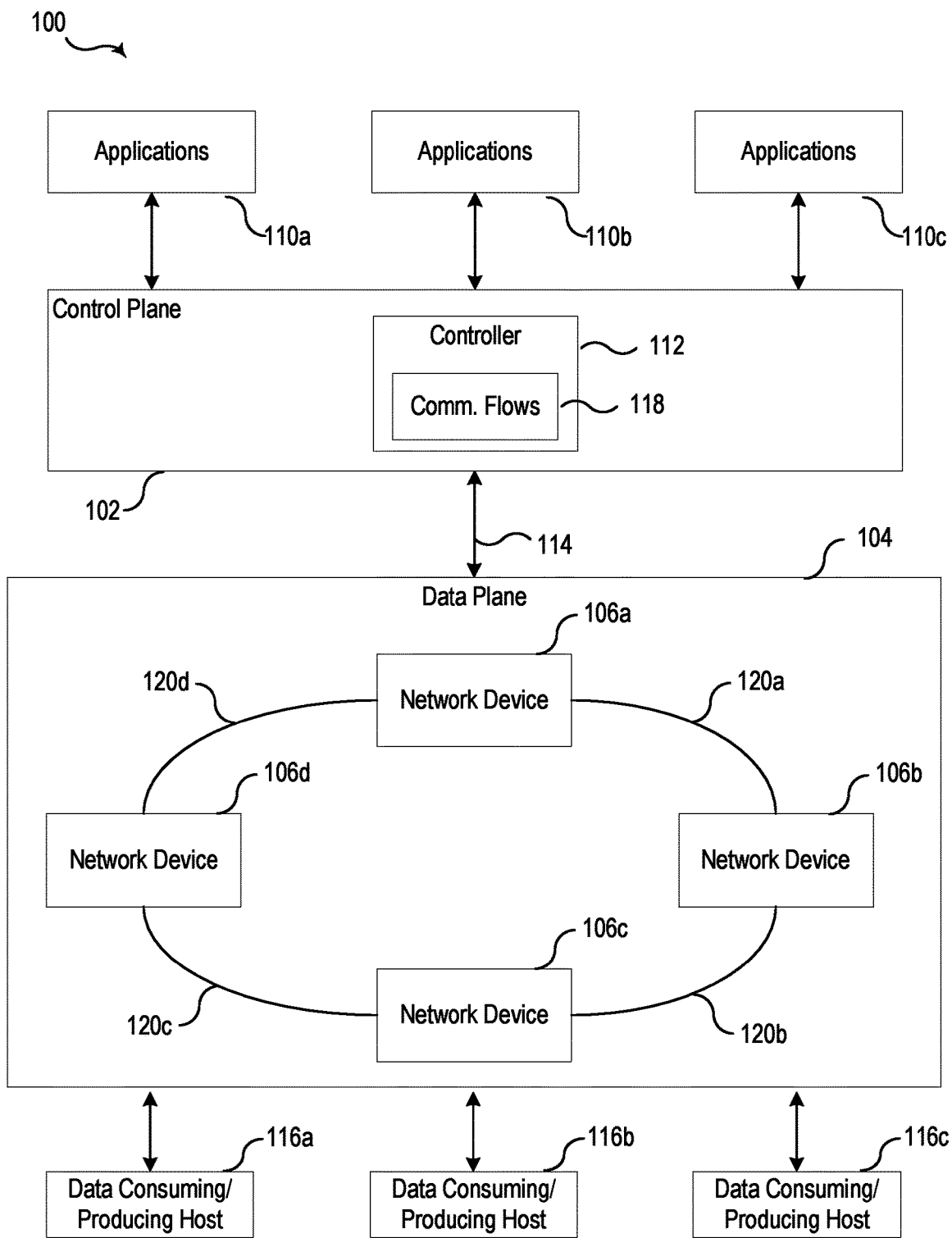
FIG. 1 illustrates a conceptual representation of an SDN system including a control plane, a data plane, and a plurality of data consuming/producing hosts consistent with embodiments of the present disclosure.

Modern electric power distribution and transmission systems may incorporate a variety of communication technologies to monitor, control, and protect the system. The communication equipment may be configured and utilized to facilitate an exchange of data among a variety of devices that monitor conditions associated with the power system and implement control actions to maintain the stability of the power system. The communication networks carry information utilized for the proper assessment of power system conditions and for implementing control actions based on such conditions. Such messages may be subject to time constraints because of the potential for rapid changes in conditions in an electric power transmission and distribution system. In other words, if the messages are delayed, the data in the messages may no longer be accurate or useful to a receiving device.

Some electric power transmission and distribution systems may incorporate software defined network ("SDN") technologies that utilize a controller to configure and monitor the network. SDN technologies offer a variety of features that may be advantageous in electric power systems (e.g., a deny-by-default security policy, better latency control, symmetric transport capabilities, redundancy and fail over planning, etc.).

An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to achieve the optimal usage of network resources by creating specific data flows through the communication network. A data flow, as the term is used herein, refers to a set of parameters used to match and take action based on network packet contents. Data flows may permit dedicated paths based on a variety of criteria that offer significant control and precision to operators of the network. In contrast, in large traditional networks, trying to match a network-discovered path with an application-desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

Significant complexity in a traditional network arises from the fact that each network device (e.g., a switch or router) has control logic and data-forwarding logic integrated together. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or a Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane, by setting their forwarding tables. This enables centralized configuration and management of a network. As such, the data plane in an SDN consists of relatively simple packet forwarding devices with a communications interface to the controller to receive forwarding information. In addition to simplifying management of a network, an SDN architecture may also enable monitoring and troubleshooting features that may be beneficial for use in an electric power distribution system, including but not limited to: mirroring a data-selected flow rather than mirroring a whole port; alarming when bandwidth approaches saturation; providing metrics (e.g., counters and meters for quality of service, packet counts, errors, drops, or overruns, etc.) for a specified flow; and permitting monitoring of specified applications rather than monitoring based on virtual local area networks (VLAN) or media access control (MAC) addresses.

The configuration of traditional networks and SDNs to support electric power systems and other industrial-scale projects is complicated, time consuming, and requires a high level of technical proficiency. Minor configuration errors may result in malfunctions or inefficiencies in critical infrastructure. Moreover, identifying and remediating such errors may be time consuming and difficult.

The inventors of the present disclosure have recognized various advantages associated with automating the design and/or configuration of an SDN. Optimizing and automating the design of an SDN may increase the efficiency of the network, decrease the cost of the network, reduce the effort and related expense of designing and configuring the network, and/or avoid errors that could create security vulnerabilities in the network.

Systems and methods consistent with the present disclosure may generate both a physical network topology and communication flows to create an optimized design based on user-provided parameters. The user-provided parameters may include performance requirements, organizational policies, interface architectures, and the like. Based on the user-provided inputs, systems and methods consistent with the present disclosure may generate an optimized design. Further, various embodiments may generate some or all communication flows within the network. Moreover, the design may also identify suitable equipment that supports the configuration, bandwidth requirements, link distances, and other parameters associated with the design.

In certain embodiments, multiple design possibilities may be generated and presented to a user, and may allow the user to make implementation decisions, such as balancing benefit of additional costs in comparison to improved reliability or other metrics. In one embodiment, a system may generate designs with improved redundancy and project the additional cost associated with such designs. For example, a system may determine the cost of increasing the redundancy of an SDN from N-1 (where N means that all communications continue to happen and "1" is how many network faults can be handled to continue to provide full communication delivery) to an N-2 system. Increasing the redundancy may increase the number of switches, cables, and interconnections in the system, and may increase the cost of the system. The user may assess both designs and make an informed decision about whether the added costs are warranted by the improved reliability of the system.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates a conceptual representation of an SDN system 100 including a control plane 102, a data plane 104, and a plurality of data consuming/producing hosts 116a-116c consistent with embodiments of the present disclosure. The control plane 102 directs the flow of data through the data plane 104. More specifically, a controller 112 may communicate with a plurality of network devices 106a-106d via an interface 114 to establish data flows. The controller may specify rules for routing traffic through the data plane 104 based on a variety of criteria.

The data plane 104 includes a plurality of network devices 106a-106d in communication with one another via a plurality of physical links 120a-120d. In various embodiments, the network devices 106a-106d may be embodied as switches, multiplexers, and other types of network devices. The physical links 120a-120d may be embodied as Ethernet, fiber optic, and other forms of data communication channels. As illustrated, the physical links 120a-120d between the network devices 106a-106d may provide redundant connections such that a failure of one of the physical links 120a-120d is incapable of completely blocking communication with an affected network device. In some embodiments, the physical links 120a-120d may be configured to provide a desired level of redundancy (e.g., N-1, N-2).

The data consuming/producing hosts 116a-116c may represent a variety of devices within an electric power transmission and distribution system that produce or consume data. For example, data consuming/producing hosts 116a-116c may, for example, be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be routed through the data plane 104 using a plurality of communication flows 118 implemented by controller 112. Of course, data consuming/producing hosts 116a-116c may be embodied by a wide range of devices consistent with embodiments of the present disclosure.

Applications 110a-110c may represent a variety of applications operating in an applications plane. In the SDN architecture illustrated in FIG. 1, controller 112 may expose an application programming interface (API) that applications 110a-110c can use to configure the data plane 104. In this scenario, controller 112 may act as an interface to the data plane 104 while the control logic resides in the applications 110a-110c. The configuration of controller 112 and applications 110a-110c may be tailored to meet a wide variety of specific needs.

Figure 2:
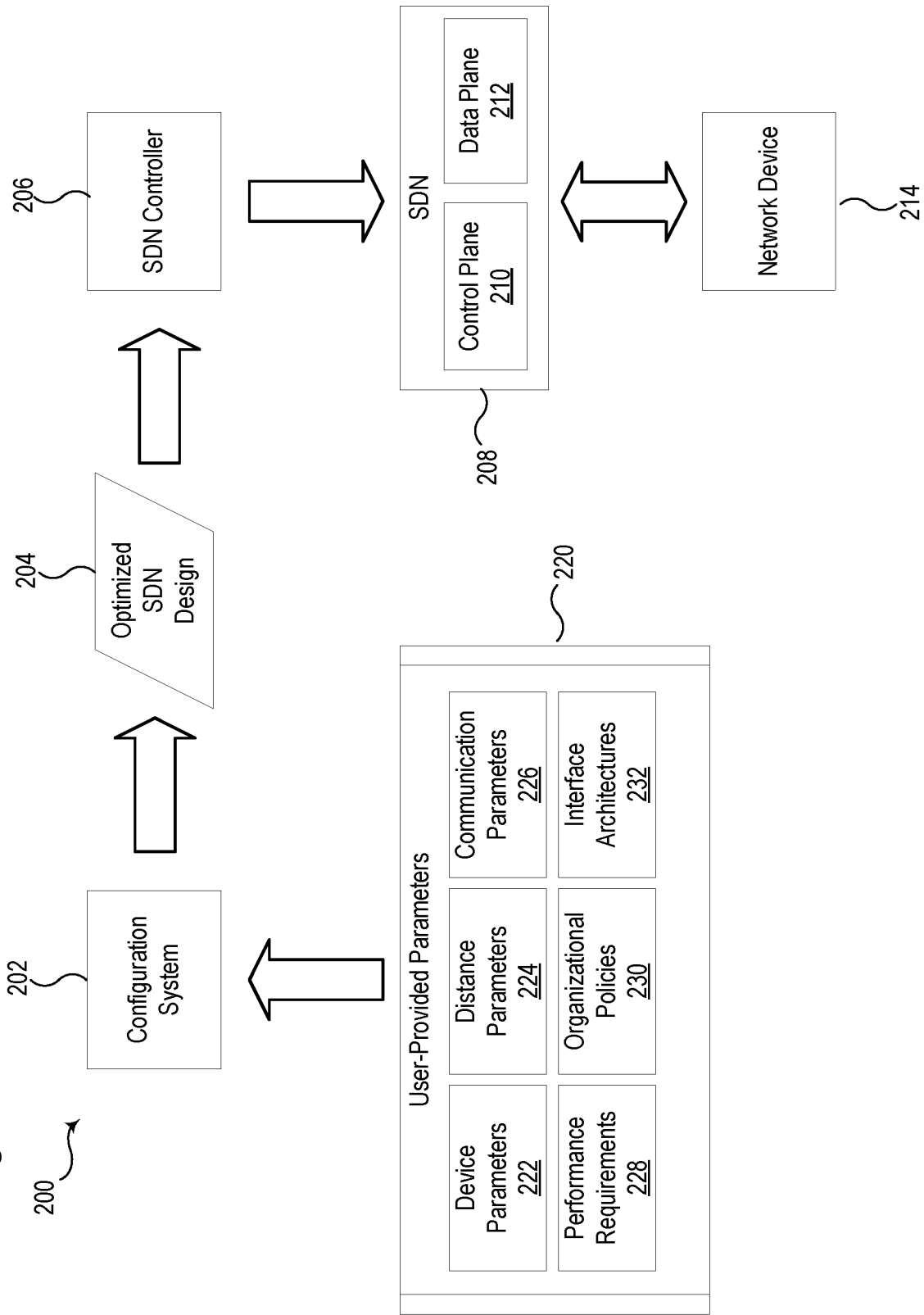
FIG. 2 illustrates a conceptual representation of a system to automate the design and configuration of an SDN consistent with the present disclosure.

FIG. 2 illustrates a conceptual representation 200 of a system to automate the design and configuration of an SDN consistent with the present disclosure. System 200 includes a configuration system 202. The configuration system 202 may receive user-provided parameters 220 that it uses to generate an optimized SDN design 204. In various embodiments, the configuration system 202 may include a user interface to receive a plurality of user-provided parameters 220. The specific user-provided parameters 220 may depend upon the system.

Device parameters 222 may include the number of devices in the SDN and information about the specific types of devices. In some embodiments, system 200 may comprise or may be in communication with a library. The library may include parameters of devices of various types. The library may reduce the burden associated with entering parameters for commonly used devices.

Distance parameters 224 may include information about the distances between various elements in the SDN. For example, distance parameters 224 may reflect the length of connections between a host and a switch or connection between a switch and another switch. Such information may be used to ensure that the optimized system design satisfies performance metrics (e.g., transmission latency) and make appropriate hardware to accommodate specified link distances.

Communications parameters 226 may include information about the communication protocols and formats used by devices in the SDN. Common communication formats used by equipment in an electric power system include Supervisory Control and Data Acquisition (SCADA), Generic Object Oriented Substation Events (GOOSE), telnet, and the like. Of course, a variety of other types of communication protocols may also be used, such as hypertext transfer protocol (HTTP), secure shell (SSH), transport layer security (TLS), and the like.

Performance requirements 228 may specify various parameters related to the operation of the network. Latency may be one specific performance requirement that is important in embodiments of the present disclosure related to an electric power system. Conditions in an electric power system may change rapidly, and as such, information about electrical parameters in the system may be time sensitive. Other parameters may include but are not limited to bandwidth, jitter, error rate, and the like. Configuration system 202 may ensure that performance requirements 228 are met by proposed SDN designs. When resolving the performance requirements, a set of profiles for each application may be used to simulate expected network traffic. For example, the bandwidth and latency of SCADA, or synchrophasors, or IEC61850-9-2 sampled measured values may be included within the profiles and used to determine whether a proposed design will satisfy the performance requirements. Such a system may estimate whether the performance requirements can be satisfied before the SDN is implemented.

Organizational policies 230 may be implemented to ensure that a resulting SDN is consistent with an organization's existing policies. For example, an organization may implement a policy restricting remote access to sensitive equipment to reduce the potential for authorized access. An organizational policy may identify the specific types of equipment that are only locally accessible and those that may be accessed remotely. Other types of organizational policies may also be implemented.

Interface architectures 232 may specify that various devices utilize multiple interfaces. For example, various devices may include multiple interfaces, and interface architectures 232 may specify whether such interfaces are bridged or configured to failover. In various embodiments, Parallel Redundancy Protocol (PRP) may be utilized.

Configuration system 202 may generate an optimized SDN design 204 based on the user-provided parameters 220. In various embodiments, configuration system 202 may provide a variety of possible designs and/or alternatives and allow a user to select a desired design.

The optimized SDN design 204 may specify a variety of communication flows and settings that may be implemented in an SDN 208 by an SDN controller 206. SDN controller 206 may implement specific communication flows by programming the control plane 210 of the SDN 208 based on the optimized SDN design 204. Further, the SDN controller 206 may identify specific network devices 214 associated with the data plane 212 and ensure that such devices are configured in accordance with the optimized SDN design 204.

Figure 3:
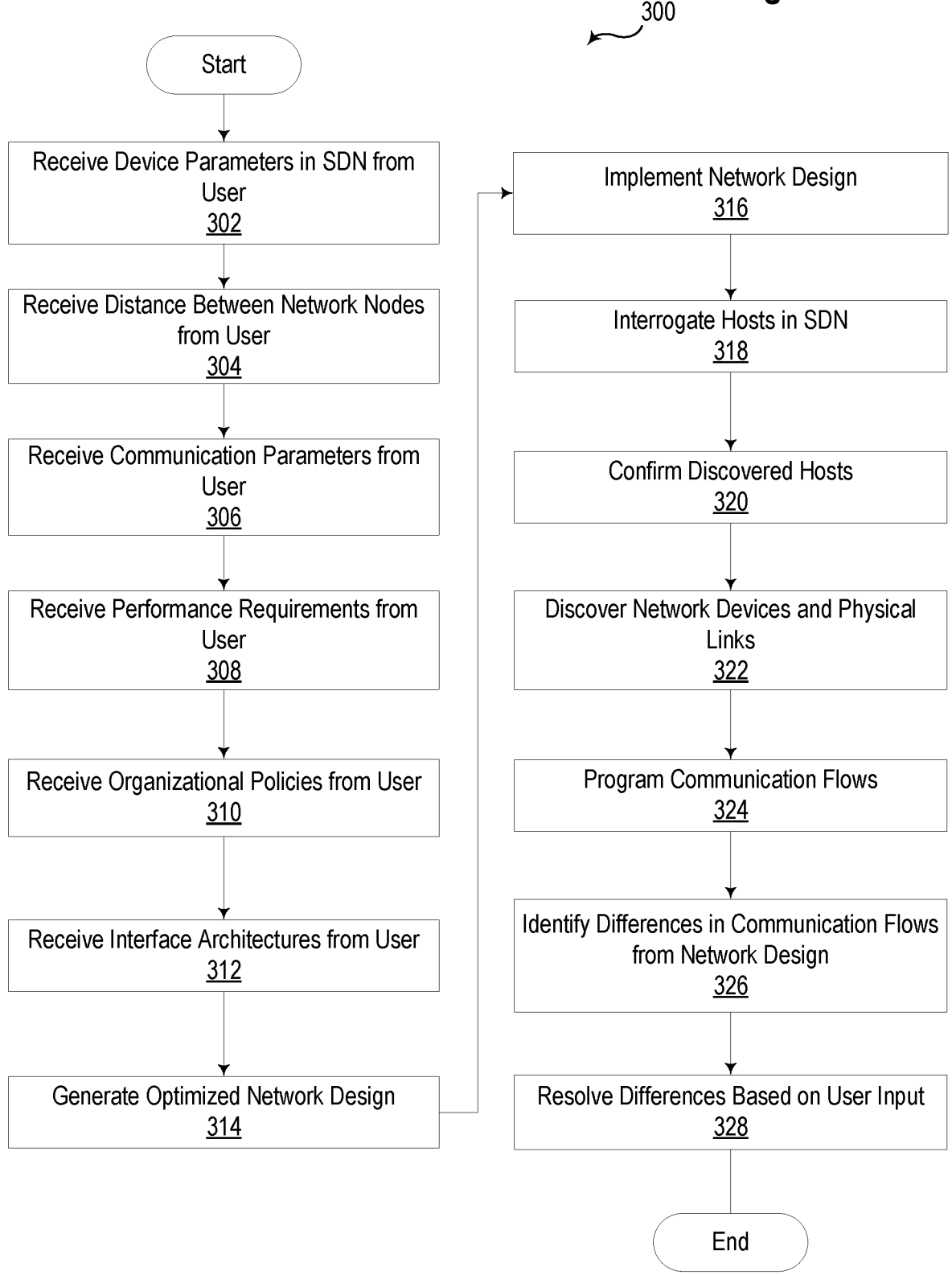
FIG. 3 illustrates a flow chart of a method for automating the convergence of a physical design and configuration of an SDN consistent with embodiments of the present disclosure.

FIG. 3 illustrates a flow chart of a method 300 for automating the convergence of a physical design and configuration of an SDN consistent with embodiments of the present disclosure. At 302 through 312, method 300 may prompt a user to input various parameters relating to an SDN. At 302, method 300 may receive device parameters from a user. The device parameters may include the number of devices in the SDN and information about the specific types of devices. At 304, the user may provide the distance between network nodes in the SDN. The distances may reflect the length of connections between a host and a switch or connection between a switch and another switch. At 308, method 300 may receive performance requirements from the user. The performance may specify various parameters related to the operation of the network, such as latency, bandwidth, jitter, etc. At 310, the user may provide organizational policies. Such policies may be used to ensure that a resulting SDN design is consistent with an organization's existing policies. Such policies may include security policies, naming conventions, address conventions, and the like. At 312, method 300 may receive interface architectures from the user for devices that include multiple interfaces. The interface architectures may be bridged or configured to failover from one interface to another.

At 314, method 300 may generate an optimized network design based on the user-provided parameters received at 302-312. In various embodiments, method 300 may provide multiple designs, options, and features, consistent with the user-provided parameters. A user may then select from the available designs and options based on additional considerations. Such considerations may include cost, redundancy, reliability, etc. The network design may include recommendations for specific devices that meet the performance requirements specified by the user.

Once a design is selected, the network design may be implemented by physically installing the network components at 316. Once connected, an SDN controller may discover and interrogate the hosts in the SDN at 318. In various embodiments, IP addresses, MAC addresses, VLAN tags, protocols, and/or scripts may be executed to interrogate the hosts to automatically attach the newly discovered host with the virtually designed system. Once discovered and assigned to the assumed host, the controller may attempt to discover the remaining network interfaces if the host is operating in a multi-network interface mode. This discovery covers the attributes of a single host having multiple physical network interfaces with shared addresses and multiple addresses. In the case where a single host has multiple IP addresses and a shared MAC address, the controller may combine the network interfaces to a single host. In the case where an IP address and a MAC address are different but the host has MAC addresses that follow a predictable pattern (e.g., each network interface has a MAC address that increments by one value), the multiple network interfaces may be combined to a single host. At 320, a user may confirm the discovered hosts and associated information and resolve any issues with devices that were not automatically resolved in the subsystem.

At 322, the controller may discover network devices and physical links in the SDN. The controller may provide an alert if any connections are identified that do not match the network design. The user may resolve any such issues by revising the design or removing the identified connections. Once the connections match the network design, the controller programs the network devices to support communication among the network hosts. Communication flows may be established at 324 between each host according to the network design and based on the user-provided parameters.

At 326, the controller may identify differences between the communication flows identified in the design and actual communication flows. The controller may further provide alerts if any additional communication flows are discovered that are not specified in the design. Further, the controller may identify communication flows that are active (i.e., communication flows that have packet traffic) and flows that are inactive (i.e., communication flows that do not have packet traffic) so the operator can determine if the virtual design has covered all of the communications on the network.

At 328, a user may resolve any differences in communication flows from the network design identified at 326. Where appropriate, communication flows may be added, removed, or altered to resolve any differences and/or address any inactive communication flows.

In some embodiments, the controller may compare actual performance to the estimated performance of the SDN. Such comparisons may allow for improvements in the ability of the system to estimate performance of future networks. The actual performance may be determined by measuring various network parameters and determining whether such parameters are consistent with the estimated values of those parameters. For example, latency and jitter may be tracked using precision time protocol measurements, which may be compared to estimated values and user-specified performance thresholds. If the actual values exceed the estimated values, the methods of generating the estimates may be adjusted to more closely align the estimates with actual values. Further, if the actual values exceed the user-provided performance thresholds, an alert may be generated and may prompt a user to take appropriate action.

Figure 4:
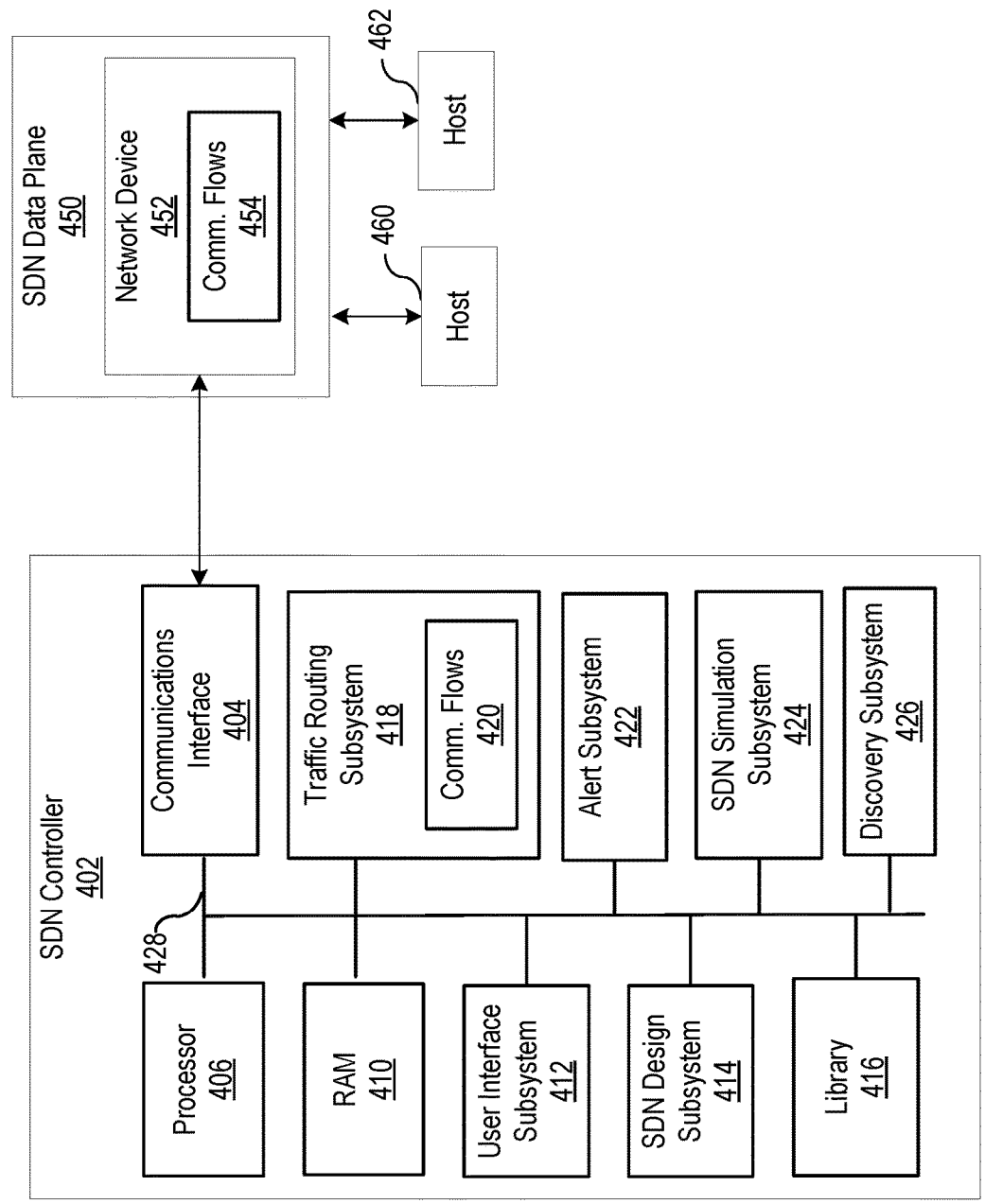
FIG. 4 illustrates a functional block diagram of a system including an SDN controller in communication with an SDN data plane comprising a network device, and a plurality of hosts consistent with embodiments of the present disclosure.

FIG. 4 illustrates a functional block diagram of a system 400 including an SDN controller 402 in communication with an SDN data plane 450 comprising a network device 452, and a plurality of hosts 460 and 462 consistent with embodiments of the present disclosure. In some embodiments, system 400 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

SDN controller 402 includes a communications interface 404 configured to communicate with an SDN data plane 450. Communications interface 404 may allow SDN controller 402 to program network device 452 with communication flows 454. Network device 452 may implement communication flows 454 to selectively route traffic between hosts 460 and 462.

Processor 406 may be configured to process communications received via communications interface 404 and user interface subsystem 412 and to coordinate the operation of the other components of SDN Controller 402. Processor 406 may operate using any number of processing rates and architectures. Processor 406 may be configured to perform any of the various algorithms and calculations described herein. Processor 406 may be embodied as a general-purpose integrated circuit, an application-specific integrated circuit, a field-programmable gate array, and/or any other suitable programmable logic device.

Instructions to be executed by processor 406 may be stored in random access memory 410 (RAM). Such instructions may include designing and configuring an SDN as described herein. A data bus 428 may facilitate communication among various components of SDN controller 402.

A user-interface subsystem 412 may be configured to receive from a user various types of information relating to configuration of an SDN. In some embodiments, the user interface subsystem 412 may receive user-provided parameters related to the design of an SDN. In one specific embodiment, the user-interface subsystem 412 may be configured to receive the user-provided parameters 220 illustrated in FIG. 2. Further, the user interface subsystem 412 may be used to confirm various aspects of the SDN with the user. Such confirmations may include the confirmation of discovered hosts at 320 and resolution of differences in communication flows from a network design at 328 as illustrated in FIG. 3.

An SDN design subsystem 414 may generate an optimized physical and logical design of an SDN based on user-provided parameters. SDN design subsystem 414 may generate both a physical network topology and communication flows within a data plane to enable communication between hosts 460 and 462. In certain embodiments, SDN design subsystem 414 may generate multiple design possibilities that are presented to a user. The user may select a specific design based on the benefit and costs of various options. In one embodiment, a system may generate designs with improved redundancy and project the additional cost associated with such designs.

A library 416 may contain profiles of a plurality of devices, protocols, and sampled values that may be used in the design of an SDN. Such information may include parameters about the capabilities of various devices, such as permitted configurations, bandwidth and throughput capabilities, supported link distances, and similar performance metrics associated with each device. The performance metrics associated with various devices may be used to determine whether the user-specific performance requirements can be satisfied by a particular design before the SDN is implemented. Further, the library 416 may include, among other things, communications circuit types and their associated performance requirements. In one specific embodiment, library 416 may include performance requirements for the GOOSE protocol so that when these types of circuits are specified, SDN design subsystem 414 may apply or calculate the appropriate performance requirements in generating the SDN configuration.

Traffic routing subsystem 418 may generate a variety of communication flows 420 in SDN data plane 450 based on the SDN design generated by the SDN design subsystem 414. The traffic routing subsystem 418 may specify the configuration of a variety of devices in the SDN data plane 450 (e.g., routers, switches, multiplexers, etc.) that enable communications between hosts 460 and 462. The communication flows 420 generated by traffic routing subsystem 418 may be implemented by network device 452.

Alert subsystem 422 may generate an alert based on various conditions associated with the operation of the SDN. For example, an alert may be generated if SDN controller 402 identifies communication flows 454 that do not match the network design generated by SDN design subsystem 414. A user may resolve the alert by adding the identified communication flows 454 to the design or by removing the communication flows 454. Alert subsystem 422 may also respond to conditions that may arise during operation of the SDN. For example, an alert may be generated if the actual performance of the SDN varies from the user-provided parameters. In one specific embodiment, an alert may be generated when the latency of a communication flow exceeds a user-provided latency parameter.

An SDN simulation subsystem 424 may simulate the operation of an SDN design to ensure that the design satisfies the user-provided parameters. The simulation subsystem 424 may operate in conjunction with the SDN design subsystem 414 to assess the performance of various designs and alternatives before such system are implemented. SDN simulation subsystem 424 may include a set of profiles for each application expected to generate network traffic within the SDN. For example, the bandwidth and latency of SCADA, synchrophasors, or IEC61850-9-2 sampled measured values, may be included within the profiles and used to determine whether a proposed design will satisfy the user-provided performance requirements. Such a system may estimate whether the performance requirements can be satisfied before the SDN is implemented.

A discovery subsystem 426 may discover and interrogate the network device 452 and hosts 460 and 462. Once the SDN is implemented, SDN controller 402 may identify network device 452. Further, in various embodiments, IP addresses, MAC addresses, VLAN tags, protocols, and/or scripts may be executed to discover hosts 460 and 462. Once discovered, the SDN controller 402 may establish communication between hosts 460 and 462 by implementing communication flows 454 according to the SDN design.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to generate a physical design and a logical design of a software defined network (SDN), the system comprising:
   a user interface subsystem to receive a plurality of user-provided parameters associated with a plurality of performance requirements of the SDN;
   a library comprising:
      a plurality of performance metrics associated with a plurality of devices in the SDN;
      a plurality of profiles associated with a plurality of applications expected to operate in the SDN; and
      a plurality of expected traffic patterns associated with the plurality of applications;
   an SDN design subsystem to generate the physical design and the logical design of the SDN based on the user-provided parameters and the performance metrics of the plurality of devices in the library;
   a traffic routing subsystem to generate a plurality of communication flows based on the physical design and the logical design and to be implemented by the SDN; and
   an SDN simulation subsystem to generate an assessment of the physical design and the logical design of the SDN and the plurality of communication flows in comparison to the user-provided parameters and prior to implementation of the SDN using the plurality of performance metrics associated with the plurality of devices in the SDN, the plurality of profiles associated with a plurality of applications expected to operate in the SDN, and the plurality of expected traffic patterns associated with the plurality of applications.

2. The system of claim 1, further comprising a discovery subsystem to identify a plurality of network devices in an SDN data plane after implementation of the SDN.

3. The system of claim 2, wherein the SDN design subsystem programs the plurality of network devices with the communication flows.

4. The system of claim 2, wherein the discovery subsystem further identifies a plurality of hosts in communication with the SDN data plane and the plurality of communication flows selectively enable communication between the plurality of hosts.

5. The system of claim 1, further comprising an alert subsystem to provide an alert upon detection of a communication flow that differs from the design of the SDN generated by the SDN design subsystem after implementation of the SDN.

6. The system of claim 1, further comprising an alert subsystem to provide an alert upon identification of a deviation from the user-provided parameters after implementation of the SDN.

7. The system of claim 1, further comprising an alert subsystem to provide an alert upon identification of a communication flow that is inactive after implementation of the SDN.

8. The system of claim 1, wherein the SDN design subsystem generates a plurality of physical designs consistent with the user-provided parameters and the user interface subsystem facilitates selection of one of the plurality of physical designs.

9. The system of claim 8, wherein at least one of the plurality of designs provides increased redundancy in comparison to at least one other of the plurality of designs.

10. The system of claim 1, wherein the user-provided parameters comprise device parameters, distance parameters, communication parameters, performance requirements, organizational policies, and interface architectures.

11. A method of generating a physical design and a logical design of a software defined network (SDN), the method comprising:
  receiving, using a user interface subsystem, a plurality of user-provided parameters associated with a plurality of performance requirements of the SDN;
  providing a library comprising:
    a plurality of performance metrics associated with a plurality of devices in the SDN,
    a plurality of profiles associated with a plurality of applications expected to operate in the SDN, and
    a plurality of expected traffic parameters associated with the plurality of applications;
  generating, using an SDN design subsystem, the physical design and the logical design of the SDN based on the user-provided parameters and the performance metrics of the plurality of devices in the library;
  generating, using a traffic routing subsystem, a plurality of communication flows based on the physical design and the logical design and to be implemented by the SDN; and
  generating, using an SDN simulation subsystem, an assessment of the physical design and the logical design of the SDN and the plurality of communication flows in comparison to the user-provided parameters and prior to implementation of the SDN using the plurality of performance metrics associated with the plurality of devices in the SDN, the plurality of profiles associated with a plurality of applications expected to operate in the SDN, and the plurality of expected traffic patterns associated with the plurality of applications.

12. The method of claim 11, further comprising identifying, using a discovery subsystem, a plurality of network devices in an SDN data plane after implementation of the SDN.

13. The method of claim 12, further comprising programming, using the SDN design subsystem, the plurality of network devices with the communication flows.

14. The method of claim 12, further comprising identifying, using the discovery subsystem, a plurality of hosts in communication with the SDN data plane and selectively enabling communication between the plurality of hosts using the plurality of communication flows.

15. The method of claim 11, further comprising generating an alert, using an alert subsystem, upon detection of a communication flow that differs from the design of the SDN generated by the SDN design subsystem after implementation of the SDN.

16. The method of claim 11, further comprising generating an alert, using an alert subsystem, upon identification of a deviation from the user-provided parameters after implementation of the SDN.

17. The method of claim 11, further comprising generating an alert, using an alert subsystem, upon identification of a communication flow that is inactive after implementation of the SDN.

18. The method of claim 11, further comprising:
  generating, using the SDN design subsystem, a plurality of physical designs consistent with the user-provided parameters; and
  facilitating, using the user interface subsystem, selection of one of the plurality of physical designs.

19. The method of claim 11, wherein the user-provided parameters comprise device parameters, distance parameters, communication parameters, performance requirements, organizational policies, and interface architectures.

20. A non-transitory computer-readable medium with instructions stored thereon to generate a physical design and a logical design of a software defined network (SDN) and that, when executed, cause a processor of a computing device, to:
  receive a plurality of user-provided parameters associated with a plurality of performance requirements of the SDN;
  provide a library comprising:
    a plurality of performance metrics associated with a plurality of devices in the SDN,
    a plurality of profiles associated with a plurality of applications expected to operate in the SDN, and
    a plurality of expected traffic parameters associated with the plurality of applications;
  generate the physical design and the logical design of the SDN based on the user-provided parameters and the performance metrics of the plurality of devices in the library;
  generate a plurality of communication flows based on the physical design and the logical design and to be implemented by the SDN; and
  generate an assessment of the physical design and the logical design of the SDN using an SDN simulation subsystem comprising a plurality of profiles associated with the plurality of performance metrics associated with the plurality of devices in the SDN, the plurality of applications expected to operate in the SDN, and the plurality of expected traffic patterns associated with the plurality of applications.

* * * * *